United States Patent [19]

Machida et al.

[11] Patent Number: 4,804,894
[45] Date of Patent: Feb. 14, 1989

[54] MOTOR ROTATION SERVO CONTROL APPARATUS

[75] Inventors: Yukihiko Machida; Tadafusa Tomitaka, both of Tokyo, Japan

[73] Assignee: Sony Corporation, Japan

[21] Appl. No.: 57,781

[22] Filed: Jun. 3, 1987

[30] Foreign Application Priority Data

Jun. 10, 1986 [JP] Japan ............... 61-134684
Jun. 10, 1986 [JP] Japan ............... 61-134685

[51] Int. Cl.⁴ .............................. H02P 5/06
[52] U.S. Cl. ................... 318/314; 318/301; 318/309; 318/318
[58] Field of Search ............. 318/313–318, 318/323, 326, 327, 600–603, 662; 360/10, 11, 35, 70, 76, 78, 77; 358/4, 127; 369/45

[56] References Cited

U.S. PATENT DOCUMENTS

| | | | |
|---|---|---|---|
| 4,131,912 | 12/1978 | Hirai | 360/10.3 |
| 4,151,570 | 4/1979 | Ravizza et al. | 360/77 |
| 4,183,060 | 1/1980 | Barnette et al. | 318/662 |
| 4,189,758 | 2/1980 | Morio et al. | 360/70 |
| 4,208,680 | 6/1980 | Beaulier | 360/35.1 |
| 4,300,226 | 11/1981 | Barnette et al. | 369/45 |
| 4,386,300 | 5/1983 | Ogawa | 318/314 |
| 4,538,096 | 8/1985 | Kern | 318/314 |
| 4,543,516 | 9/1985 | Kobori et al. | 318/314 |
| 4,639,649 | 1/1987 | Seto | 318/314 |
| 4,689,540 | 8/1987 | Tani et al. | 318/314 |

Primary Examiner—William M. Shoop, Jr.
Assistant Examiner—Brian K. Young
Attorney, Agent, or Firm—Limbach, Limbach & Sutton

[57] ABSTRACT

A motor rotation control apparatus employs a comb filter circuit operable to filter out a signal component and its higher harmonics. An error signal indicative of an error between actual and target conditions of rotation of the motor is applied to the comb filter circuit after its DC component is removed. The filtered signal and the error signal are added in a circuit which produces a control signal used to control the motor rotation. In another aspect of the invention, the error signal is divided into a first digital signal having upper bits of data having a predetermined bit number and a second digital signal having the remaining lower bits of data. The lower bits of data are delayed a predetermined time and added to the error signal to compensate for lower bits of data which may be ignored in a digital-to-analog converter operable, with a limited bit number, to provide a control analog signal used to control the motor rotation.

18 Claims, 8 Drawing Sheets

MOTOR ROTATION SERVO CONTROL APPARATUS

BACKGROUND OF THE INVENTION

This invention relates to an apparatus applicable to video tape recorders and the like for providing accurate servo control of motor rotation.

Motor speed servo control apparatus have been employed for controlling the speed of rotation of motors used to drive VTR drums. It is the current practice to perform such motor speed control based upon a motor speed signal having a series of FG pulses generated at a frequency corresponding to the motor speed sensed by a frequency generator or the like sensor operable in connection with the motor. One of serious problems is reproduced picture distortion caused by noise superimposed on the motor speed signal when the drum or the frequency generator is mounted in an erroneous manner to cause drum rotation variances. Such noise superimposed on the motor speed signal has a frequency, for example, 30 hertz, corresponding to the frequency of rotation of the drum.

In order to avoid such a problem, it is the current practice to design the motor speed servo control apparatus to have a characteristic reducing the gain at a frequency around 30 hertz. However, such gain reduction raises another problem in that the servo control accuracy is influenced considerably by torque variations.

Alternatively, it has been proposed to provide an analog notch filter to attenuate the gain at a frequency around 30 hertz. However, this proposal is not suitable for applications to video tape recorders or the like where the speed of rotation of the drum is changed to accommodate different modes of operation of the apparatus so that the frequency of the noise superimposed on the motor speed signal due to drum rotation variances changes from 30 hertz. Therefore, it is not appropriate to minimize reproduced picture distortion by employing a filter having a high Q at a frequency around 30 Hz.

SUMMARY OF THE INVENTION

A main object of the invention is to provide a simple motor rotation servo control apparatus which can control motor rotation with high accuracy.

It is another object of the invention to employ a comb filter circuit to attenuate noise resulting from motor rotation variances.

It is still another object of the invention to provide a motor rotation servo control apparatus which can employ inexpensive components to effect accurate motor rotation servo control so as to minimize wow and flutter.

There is provided, in accordance with the invention, an apparatus for controlling rotation of a motor. The apparatus comprises a sensor for sensing an actual condition of the motor rotation for generating a motor rotation signal indicative of the sensed condition of the motor rotation. The sensor is connected to a signal processor for processing the motor rotation signal to provide an error signal indicative of an error between the sensed and target conditions. A means is connected to the signal processor for extracting an AC component from the error signal. A comb filter circuit receives the extracted AC component and filters out from it a motor rotation component, which may be superimposed on the motor rotation signal at a frequency of rotation of the motor and its higher harmonics. The apparatus also includes an adder for adding the filtered out signal fed from the comb filter circuit and the error signal fed from the signal processor to provide a control signal used to control the motor.

In another aspect of the invention, there is provided an apparatus for controlling the rotation of a motor. The apparatus comprises a sensor sensitive to a condition associated with the motor's rotation for generating a sensor signal corresponding to the sensed condition. The sensor is connected to a signal processor for processing the sensor signal to provide successive digital error signals each having a predetermined bit number representing the between the sensed motor rotation condition and a target motor rotation condition. The apparatus also includes a digital-to-analog converter having a predetermined effective bit number for converting a digital signal into a corresponding analog signal used to control the motor rotation. A data modification circuit is connected between the signal processor and the digital-to-analog converter for dividing each of the successive digital error signals into a first digital signal having upper bit data having a bit number equal to or less than that of the digital-to-analog converter and a second digital signal having the remaining lower bit data. The first digital signal is applied to the digital-to-analog converter. The data modification circuit includes means for adding the second digital signal to the next one of the successive digital error signals.

In still another aspect of the invention, there is provided an apparatus for controlling rotation of a motor. The apparatus comprises a sensor sensitive to motor rotation speed and phase for generating speed and phase signals indicative of the sensed motor rotation speed and phase, respectively, a first signal processor for processing the speed signal to provide successive digital speed error signals each having a predetermined bit number representing a speed error between the sensed motor rotation speed and a target motor rotation speed, and a second signal processor for processing the phase signal to provide successive digital phase error signals, each having a predetermined bit number representing a phase error between the sensed motor rotation phase and a target motor rotation phase. The modification circuit for dividing each of the successive digital phase error signals into a first digital signal having the upper bit data and a second digital signal having the remaining lower bit data. The data modification circuit includes means for adding the second digital signal to the next one of the successive digital error signals. The apparatus also includes an adder circuit for adding the digital speed error signal fed thereto from the first signal processor and the first digital signal fed from the data modification circuit, a gate control circuit for multiplying the digital speed error signal to the adder circuit by a first value and multiplying the first digital signal to the adder circuit by a second value greater than the first value, and a digital-to-analog converter for converting a digital signal fed from the adder circuit into a corresponding analog signal used to control the motor rotation.

BRIEF DESCRIPTION OF THE DRAWINGS

This invention will be described in greater detail by reference to the following description taken in connection with the accompanying drawings, in which like numerals identify like elements in the several figures and in which.

DETAILED DESCRIPTION OF THE INVENTION

Prior to the description of the preferred embodiment of the present invention, a description will be given of a comb filter circuit which is used in the motor rotation control apparatus of the invention for removal of a component of DC and a 30 Hz component and its higher harmonics from a signal inputted thereto.

Figure 1:
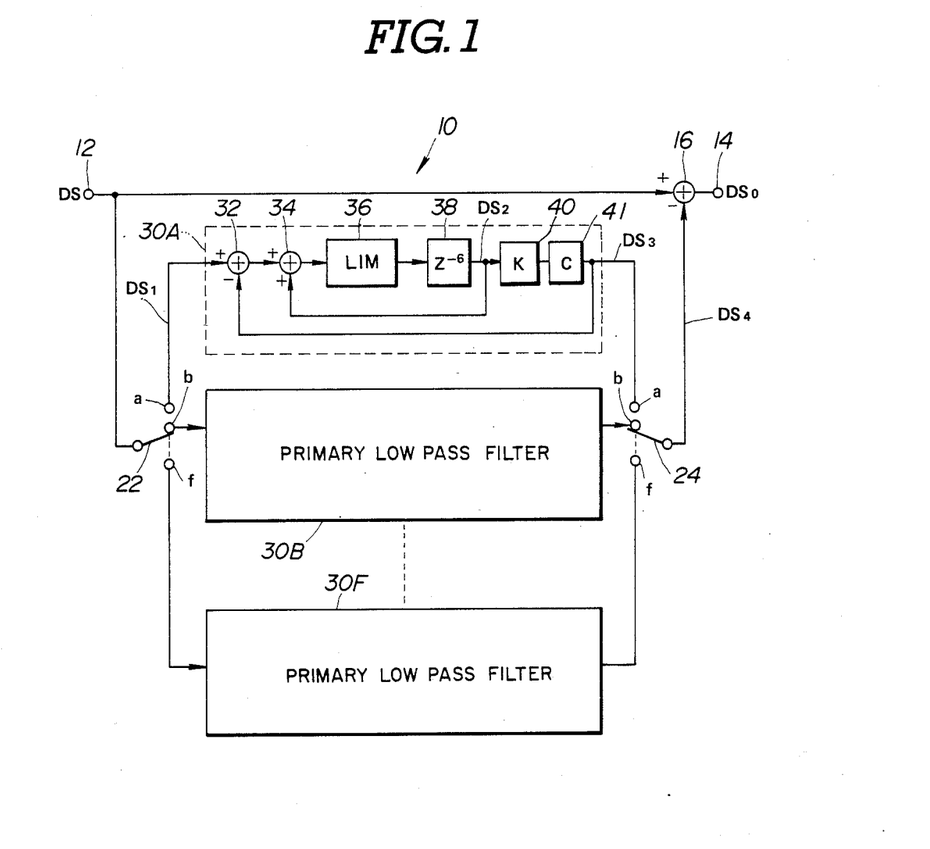
FIG. 1 is a schematic block diagram of a comb filter circuit applicable to the invention.

Referring to FIG. 1, the comb filter circuit, generally designated by the numeral 10, has an input terminal 12 and an output terminal 14. The input terminal 12 is connected to one input or an adder 16 which has an output connected to the output terminal 14. The input terminal 12 is also connected to the wiper of a six position switch 22 whose six contacts 22a ... 22f are connected through respective digital primary low pass filters 30A ... 30F to corresponding fixed contacts 24a ... 24f of a six position switch 24 whose wiper is connected to another input of the subtractor 16. Although only contacts 22a, 22b, and 22f, filters 30A, 30B, and 30F, and contacts 24a, 24b, and 24f have been shown for purposes of clarity, it will be understood that these other elements, corresponding to those which are shown, are in the actual embodiment.

The digital primary low pass filter 30A includes a subtractor 32 having an input connected to the fixed contact 22a. The output of the subtractor 32 is coupled to an integrator comprised of an adder 34, a limiter 36 and a delay circuit 38. The adder 34 receives an input from the subtractor 32 and has an output connected through the limiter 36 to the delay circuit 38. The output of the delay circuit 38 is connected to another input of the adder 34 and also to a multiplier 40 having a multiplication factor K smaller than unity. The output of the multiplier 40 is coupled to the fixed contact 24a. The other digital primary low pass filters 30B ... 30F are substantially the same in structure as the primary low pass filter 30A.

Figure 2:
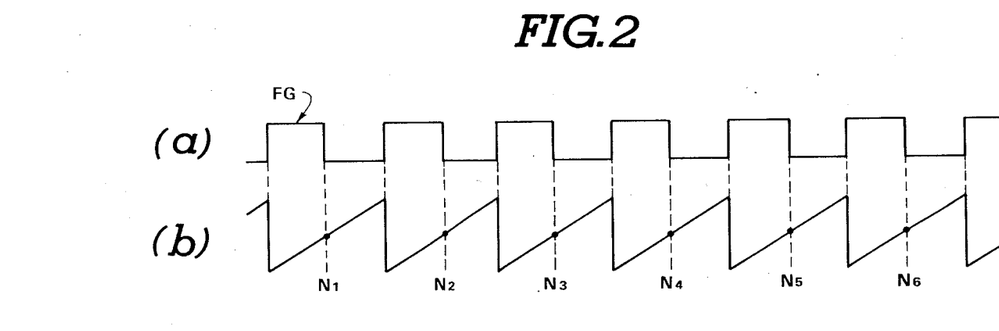
FIG. 2 contains two waveforms used in explaining the manner in which speed error data are formed.
Figure 3:
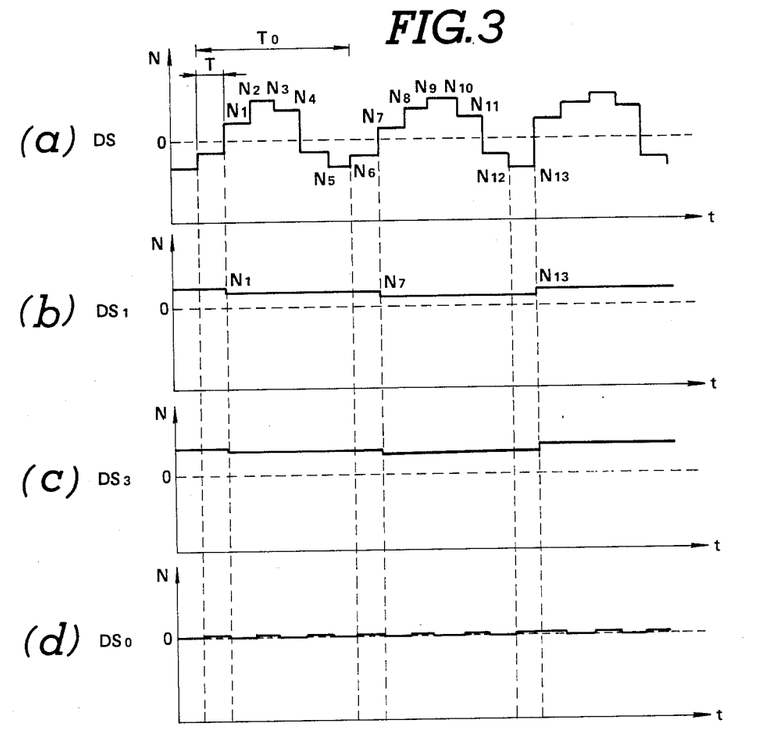
FIG. 3 contains four waveforms obtained at various points of the comb filter circuit.

Referring to FIG. 2, the waveform (a) represents a series of FG pulses generated at a frequency corresponding to a drum motor speed sensed by a sensor. These FG pulses are used to control a counter in such a manner that the counter clears its counter and starts counting clock pulses at the leading edge of each of the FG pulses and its count is sampled at the trailing edge of the FG pulses as shown by the waveform (b) of FIG. 2. The sampled values N1, N2, N3 ... constitute speed error data DS which are used to rotate the motor at a constant speed. If errors occur upon mounting the drum of the sensor, however, a 30 Hz component and its higher harmonics which are multiples of the DC component and the 30 Hz component may be superimposed on the speed error data DC, causing picture distortion. The filter circuit 10 can remove the 30 Hz component and its higher harmonics from the speed error data DS in the following manner:

Assume that the comb filter circuit 10 receives, at its input terminal 12, speed error data DS including the sampled values N1, N2, N3 ..., as shown by the waveform (a) of FIG. 3. The switches 22 and 24 receive the sampling signal from the counter and are thus switched in synchronism with the times at which the counter counts N1, N2, ... are sampled in such a manner that the comb filter 30A can handle sampled counts N1, N7, N13, ..., a primary low pass filter 30B can handle sampled counts N2, N8, N14, ..., a primary low pass filter 30C (not shown) can handle sampled counts N3, N9, N15, ..., a primary low pass filter 30D (not shown) can handle N4, N10, N16, ..., a primary low pass filter 30E (not shown) can handle sampled counts N5, N11, N17, ..., and the primary low pass filter 30F can handle sampled counts N6, N12, N18, ... .

When each of the counts N1, N7, N13, ... is sampled, the switch 22 is set to connect the input terminal 12 to the primary low pass filter 30A and the switch 24 is set to connect the primary low pass filter 30A to the adder 16. As a result, the speed error data $DS^1$, as shown by the waveform (b) of FIG. 3, are fed to the primary low pass filter 30A. The data $DS^1$ are fed to the subtracter 32 and hence to the integrator comprised of the adder 34, the limiter, 36 and the delay circuit 38. The limiter 36 limits the dynamic range of the signal inputted thereto. The delay circuit 38 delays the signal inputted thereto for a time during which six counter counts are sampled; that is, the drum motor makes a full rotation. The delay circuit 38 generates data $DS^2$ which are fed back to the adder 34 where they are added to the next data fed thereto from the subtractor 32. For example, if the data $DS^2$ corresponds to the sampled count N1, the adder 34 adds the data $DS^2$ to the data corresponding to the count N7 sampled in the following sampling cycle. The data $DS^2$ represent the average value of the data $DS^1$. The data $DS^2$ are fed to the multiplier 40 where the data $DS^2$ are multiplied by the multiplication factor K smaller than unity to develop data $DS^3$. The data $DS^3$ represent an error of each of the sampled counts N1, N2, N3, ... from a center value (zero level), as shown by the waveform (c) of FIG. 3. It means that the primary low pass filter 30A functions in a manner substantially equivalent to an RC low pass filter for analog signals. The data $DS^3$ are fed back to the subtracter 32 which subtracts the data $DS^3$ from the data $DS^1$. The data $DS^3$ are fed from the multiplier 40 to the subtracter 16 which subtracts the data $DS^3$ from the data $DS^1$.

Figure 4:
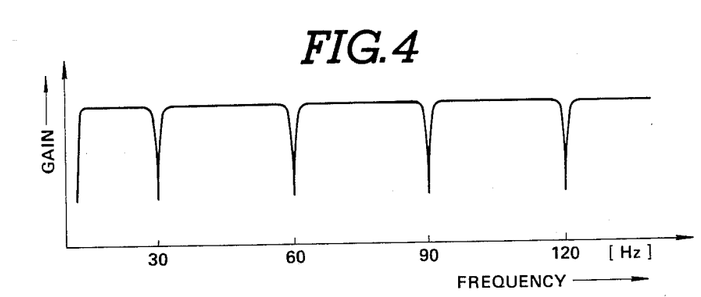
FIG. 4 is a graph showing the gain versus frequency characteristic of the comb filter circuit.

In a similar manner, the switches 22 and 24 are set to operate the other primary low pass filters 30B ... 30F successively. The result is that the subtracter 16 receives data $DS^4$ which represent the 30 Hz component and its higher harmonics extracted from the data DS. The adder 16 subtracts the data $DS^4$ from the original data DS to remove the 30 Hz component and its higher harmonics from the data DS. The dats $DS^0$ developed at the output terminal 14 is shown by the waveform (d) of FIG. 3. FIG. 4 shows the gain versus frequency characteristic of the comb filter circuit 10. It is to be noted that the frequencies of 30 Hz, 60 Hz and 90 Hz correspond to the drum motor rotational frequencies selected respectively in various modes of operation of the video tape record/playback apparatus. Therefore, the comb filter circuit 10 is effective to remove noise components superimposed on the speed error data due to nonuniform motor rotation at any selected motor speed.

Normally, the input data DS has a DC component which represents a reference value for motor speed. Since the DC component remains on the data $DS^4$, the subtractor 16 removes the DC component when it subtracts the data $DS^4$ from the data DS. This means that the comb filter circuit 10 cannot transmit a DC component. In order to transmit such a DC component, the comb filter circuit 10 is required to operate with a very complex and expensive circuit which can calculate the average value of the outputs of the respective comb filters 30A ... 30F or the average value of the input data DS and subtract the calculated average value from the data $DS^4$.

The invention provides a motor rotation control apparatus which employs a simple circuit associated with such a filter circuit as shown in FIG. 1 to permit DC component transmission.

Figure 5:
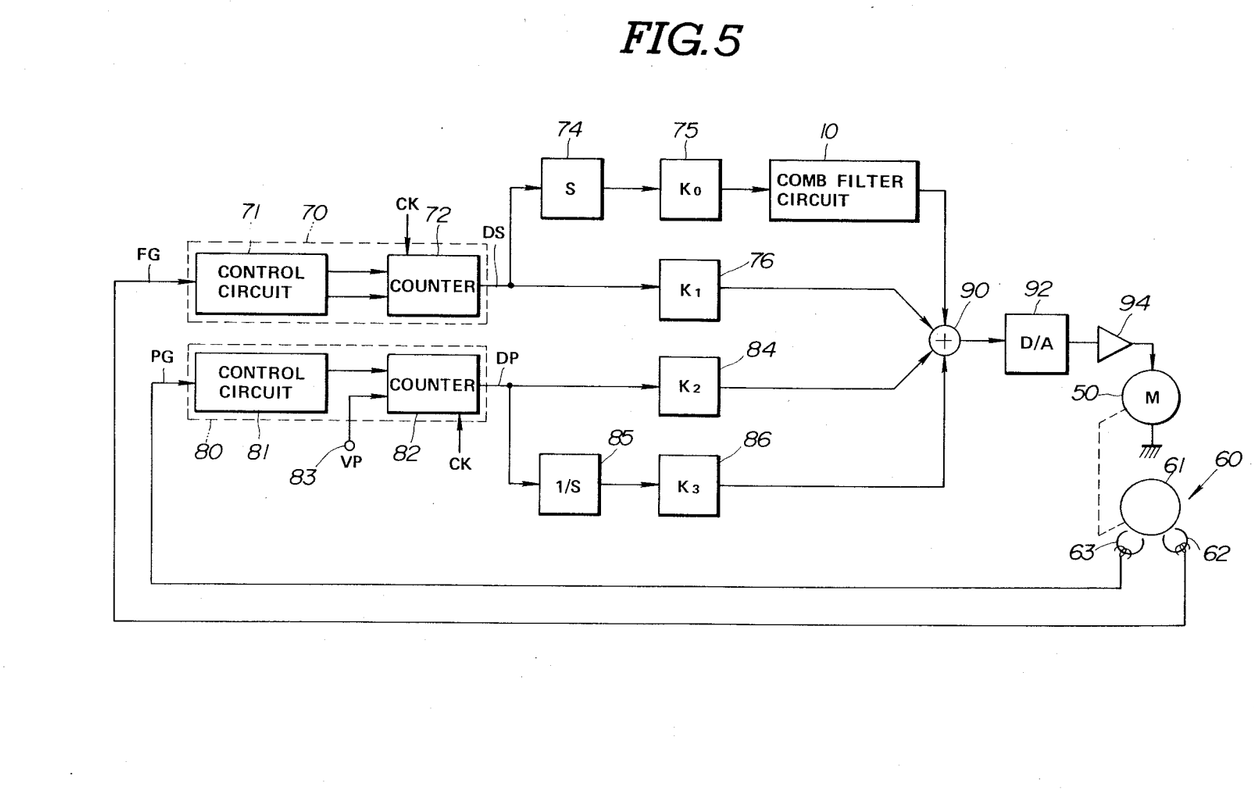
FIG. 5 is a schematic block diagram showing one embodiment of a motor rotation control apparatus made in accordance with the invention.

Referring to FIG. 5, there is illustrated one embodiment of a motor rotation control apparatus made in accordance with the invention. The apparatus is shown as including speed-servo and phase-servo loops for controlling rotation of a drum motor 50 in a manner to rotate a drum (not shown) at a constant speed. The apparatus includes a motor rotation sensor 60 having a frequency generator or pulse generator 61 operable in connection with the drum motor 50 and first and second heads 62 and 63 disposed in close proximity to the circumference of the generator 61 for generating signals which indicate the speed and phase of rotation of the drum motor 50. The first head 62 develops a series of FG pulses at a frequency corresponding to the speed of the drum motor 50, as shown by the waveform (a) of FIG. 2. The second head 63 develops a series of PG pulses each corresponding to 360 degrees of rotation of the drum motor 50, as shown by the waveform (b) of FIG. 6. The FG pulses are fed from the first head 62 to a speed error data forming circuit 70 which forms a part of the speed servo loop. The PG pulses are fed from the second head 63 to a phase error data forming circuit 80 which forms a part of the phase servo loop.

The speed error data forming circuit 70 is shown in schematic form as including a control circuit 71 connected to control a counter 72. The control circuit 71 develops a reset/start (RSC) command signal at the leading edge of each of the FG pulses and a sample (SC) command signal at the trailing edge of each of the FG pulses. Upon occurrence of such a reset/start (RSC) command signal, the counter 72 clears its count and starts counting clock pulses CK generated at a predetermined frequency, for example, 1 megahertz. The sample (SC) command signal is applied to sample the count N of the counter 72. The speed error data forming circuit 70 produces speed error data DS which include the count values N1, N2, N3, ... that are sampled in a sequential fashion, as shown in FIG. 2(b).

The output of the speed error data forming circuit 70 is coupled to an adder circuit 90 through a series circuit of a differentiating circuit 74, a first multiplier circuit 75 and the filter circuit 10 and also through a second multiplier circuit 76. The differentiating circuit 74 differentiates the speed error data DS to convert them into angular acceleration error data. It is to be noted that the DC component of the speed error data DS is removed while it is differentiated in the differentiating circuit 74 and the angular acceleration error data have an AC component only with no DC component. The first multiplier 75 has a predetermined first multiplication factor $K^0$ and multiplies the angular acceleration error data by the first multiplication factor to provide a weight for the data communicated therethrough. The multiplied angular acceleration error data are fed from the first multiplier circuit 75 to the filter circuit 10. The filter circuit 10 removes the 30 Hz component and its higher harmonics which may be superimposed on the received data, in the same manner as described previously in connection with FIG. 1. The second multiplier circuit 76 has a predetermined second multiplication factor $K^1$ and multiplies the second error data DS by the second multiplication factor $K^1$ to provide a weight for the data communicated therethrough. This loop including the second multiplier 76 is effective to communicate a DC component which represents a target or reference motor speed required to control the drum motor 50.

The phase error data forming circuit 80 is shown in schematic form as including a control circuit 81 connected to control a counter 82. The control circuit 81 develops a sample (SC) command signal at the leading edge of each of the PG pulses fed thereto from the second head 63. A vertical synchronization signal VP, shown in FIG. 6 (a), is applied at a terminal 83 to cause the counter 82 to clear its count and start counting clock pulses CK generated at a predetermined frequency, for example, 1 megahertz. The sample (SC) command signal is applied from the control circuit 81 to sample the count M of the counter 82. Teh phase error data forming circuit 80 produces phase error data DP which include the count values M1, M2, ... that are sampled in a sequential fashion, as shown in FIG. 3.

The output of the phase error data forming circuit 80 is coupled to the adder 90 through a third multiplier circuit 84 and also through a series circuit of an integration circuit 85 and a fourth multiplier circuit 86. The third multiplier circuit 84 has a predetermined third multiplication factor $K^2$ and multiplies the phase error data DP by the third multiplication factor $K^2$ to provide a weight for the data communicated therethrough. The integration circuit 85 integrates the phase error data DP. The fourth multiplier circuit 86 has a predetermined fourth multiplication factor $K^3$ and multiplies the integrated data by the fourth multiplication factor $K^3$ to increase the gain of the phase servo loop for low-frequency band components.

The adder 90 adds the data fed from the filter circuit 10 and the second, third and fourth multiplier circuits 76, 84 and 86. The added data are fed from the adder 90 to a digital-to-analog converter 92 which converts them into a corresponding analog control signal. This control signal is applied to a drive amplifier circuit 94 which thereby controls the speed and phase of rotation of the drum motor 50.

In the illustrated embodiment, the first, second, third and fourth multiplication factors $K^0$, $K^1$, $K^2$ and $K^3$ are set as $K^0 > K^1 > K^2 > K^3$ in order that the motor rotation control apparatus has a faster response to a speed error than is obtained for a phase error.

In the illustrated embodiment, the speed error data DS are differentiated to have their DC component removed before the data are processed in the filter circuit 10 so that the filter circuit 10 can handle the AC component only. This permits the rotation control apparatus to remove only the component related to the actual variances of rotation of the drive motor 50. This effect is improved by the first multiplier circuit 75, which has the greatest multiplication factor $K^0$. In addition, the DC component produced by a hold means in the counter 72, which represents a target or reference motor speed required to control the drum motor, is communicated through the second multiplier circuit 76 to the adder 90.

Although this embodiment has been described in connection with a digital servo circuit, it is to be noted that it is equally applicable to analog servo circuits, in which case the delay circuit 38 (FIG. 1) may use a CCD (charge coupled device) element.

According to this embodiment, it is possible to remove errors introduced into motor rotation servo control due to motor rotation variances by a simple circuit arrangement. In addition, it is possible to handle superimposed noise and its higher harmonics by only using comb filters having a high Q. This is effective to avoid low-frequency band phase shift and to achieve stable and accurate motor rotation control.

Figure 6:
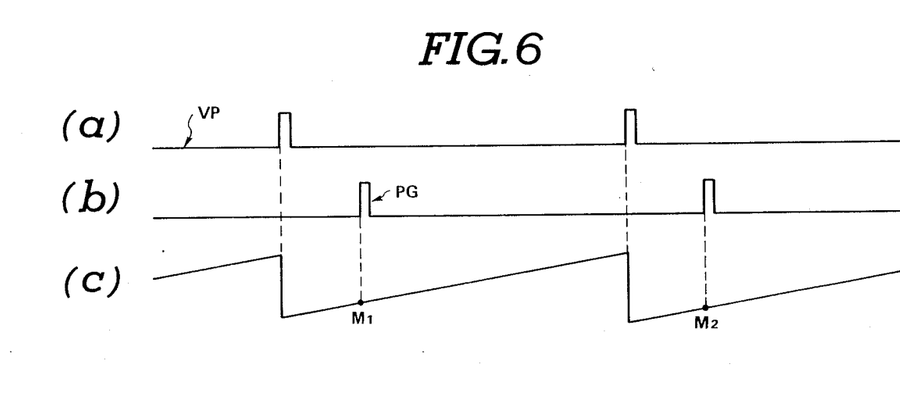
FIG. 6 contains three waveforms used in explaining the manner in which phase error data are formed.
Figure 7:
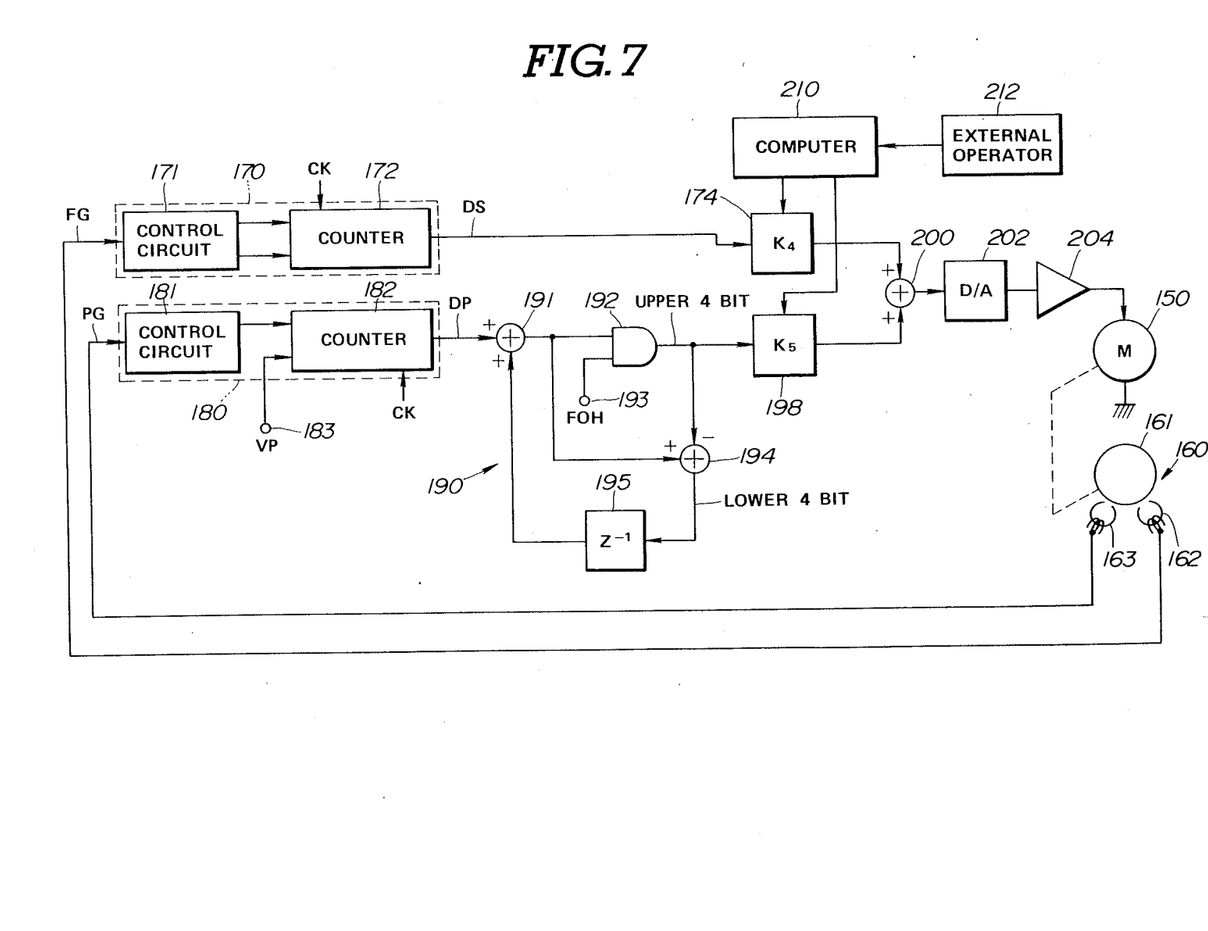
FIG. 7 is a schematic block diagram showing a second embodiment of the motor rotation control apparatus of the invention.

Referring to FIG. 7, there is illustrated a second embodiment of the motor rotation control apparatus of the invention. The apparatus is shown as including speed-servo and phase-servo loops for controlling rotation of a drum motor 150 in a manner to rotate a drum (not shown) at a constant speed. The apparatus includes a motor rotation sensor 160 which includes a frequency generator or pulse generator 161 operable in connection with the drum motor 150, and first and second heads 162 and 163 disposed in close proximity to the circumference of the generator 161 for generating signals which indicate the speed and phase of rotation of the drum motor 150. The first head 162 develops a series of FG pulses at a frequency corresponding to the speed of the drum motor 150, for example, three pulses for one rotation of the drum motor 150, as shown by the waveform (a) of FIG. 2. The second head 163 develops a series on PG pulses each corresponding to 360 degrees of rotation of the drum motor 150, as shown by the waveform (b) of FIG. 6. The FG pulses are fed from the first head 162 to a speed error data forming circuit 170 which forms a part of the speed servo loop. The PG pulses are fed from the second head 163 to a phase error data forming circuit 180 which forms a part of the phase servo loop.

The speed error forming circuit 170 is shown in schematic form as including a control circuit 171 connected to control a speed error counter 172. The control circuit 171 develops a reset/start (RSC) command signal at the leading edge of each of the FG pulses and a sample (SC) command signal at the trailing edge of each of the FG pulses. Upon occurrence of such a reset/start (RSC) command signal, the speed error counter 172 cleras its count and starts counting clock pulses CK generated at a predetermined frequency, for example, 1 megahertz. The sample (SC) command signal is applied to sample the count N of the speed error counter 172. The speed error data forming circuit 170 produces speed error data DS which include the count values N1, N2, N3, ... that are sampled in a sequential fashion, as shown in FIG. 2(b).

The output of the speed error data forming circuit 170 is coupled to an adder 200 through a first gain control circuit 174 which may be in the form of a multiplier circuit having a predetermined multiplication factor $K^4$. The first gain control circuit 174 multiplies the speed error data DS by the multiplication factor $K^4$ to provide a weight for the data communicated therethrough.

The phase error data forming circuit 180 is shown in schematic form as including a control circuit 181 connected to control a phase error counter 182. The control circuit 181 develops a sample (SC) command signal at the leading edge of each of the PG pulses fed thereto from the second head 163. A vertical synchronization signal VP is applied at a terminal 183 to cause the phase error counter 182 to clear its count and start counting clock pulses CK generated at a predetermined frequency, for example, 1 megahertz. The sample (SC) command signal is applied from the control circuit 181 to sample the count M of the phase error counter 182. The phase error data forming circuit 180 produces phase error data DP which include the count values M1, M2, ... that are sampled in a sequential fashion, as shown in FIG. 3.

The output of the phase error data forming circuit 180 is coupled through a data modification circuit, designated generally as 190, to a second gain control circuit 198 and hence to the adder 200. The second gain control circuit having a predetermined multiplication factor $K^5$ to provide a weight for the data communicated therethrough. A computer 210 controls the gains $K^4$ and $K^5$, but does not select these factors.

The data modification circuit 190 includes an adder 191 having an input from the phase error data forming circuit 180. The adder 191 has an output connected to one input of an AND gate 192 having another input connected to a terminal 193 to which a signal having an FOH code represented as "11110000" is applied. The output of the adder 191 is also connected to one input of a subtracter 194 which has another input connected to the output of the AND gate 192. The output of the subtracter 194 is connected through a delay circuit 195 to another input of the adder 191. The output of the AND gate 192 is connected to the second gain control circuit 198.

The adder 200 adds the data fed from the first and second gain control circuits 174 and 198. The added data are fed from the adder 200 to a digital-to-analog converter 202 which converts them into a corresponding analog control signal. This control signal is applied to a drive amplifier circuit 204 which thereby controls the speed and phase of the drum motor 150.

The operation of the data modification circuit 190 will be described. First of all, for purposes of this explanation, assume that the output of the phase error data forming circuit 180 is connected directly to the second gate control circuit 198 with the data modification circuit 190 being removed. The first gate control circuit 174 multiplies the speed error data DS by the multiplication factor $K^4$ and produces data represented as $K^4 \times DS$. The second gate control circuit 198, multiplies the phase error data DP by the multiplication factor $K^5$ and produces data represented as $K^5 \times DP$. The adder 200 adds the data $K^4 \times DS$ and the data $K^5 \times DP$. Assuming now that both the speed error data DS and the phase error data DP are eight bit data and that the multiplication factor $K^4$ is set at about 1 and the multiplication factor $K^5$ is set at $2^{-4}$, the data outputted from the adder 200 is represented as:

$$K^4 \times DS + K^5 \times DP = DS + 2^{-4} \times DP$$

Figure 8:
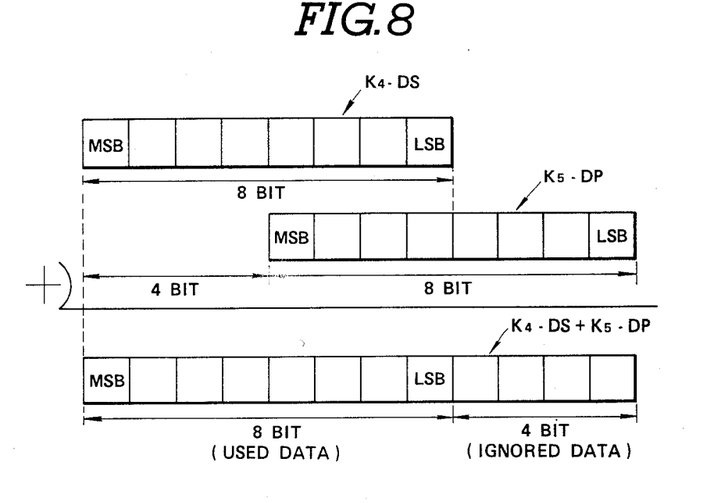
FIG. 8 is a diagram used in explaining the manner in which speed and phase error data are added before application to a digital-to-analog converter.

As shown in FIG. 8, the data $2^{-4} \times DP$ are equivalent to the phase error data DP shifted four bits toward the lower bit side and, thus, the adder data $DS + 2^{-4} \times DP$ are 12 bit data. The added data are fed to the digital-to-analog convertor 202. It is preferable that the digital-to-analog convertor 202 is an eight bit converter in view of cost considerations. Such an eight-bit digital-to-analog converter converts the upper eight-bits of digital data into analog form while omitting the other lower four-bits of data. However, this manner introduces noise into the control signal so as to degrade the motor rotation control accuracy, increase wow and flutter, and exert adverse influences on the signal particularly in its low frequency band. Although it may be possible to overcome the problem by employing a 13 bit digital-to-analog converter, it is too costly to be used in such an apparatus.

The data modification circuit 190 provides an elegant solution to the above problems. The AND gate 192 is open to communicate the data from the adder 191 to the second gain control circuit 198 when it receives a logic 1 level signal at the other input to which the F0H code signal "11110000" is applied. Therefore, the AND gate 192 communicates the upper four-bits of data of the eight-bit phase error data DP to the second gain control circuit 198 and also to the subtractor 194 which subtracts the upper four-bits of data from the eight-bit phase error data DP fed thereto from the adder 191. As a result, the subtractor 194 develops a signal representing the lower four-bits of data. The lower four-bits of data are fed to the delay circuit 195 which provides a predetermined time delay relative to the signal applied thereto from the subtracter 194, the predetermined time delay corresponding to one sampling interval at which the count values M1, M2, ... are sampled, as shown in FIG. 6(c). The delay circuit 195 may employ a memory, an eight-bit shift register, or the like capable of delaying the lower four-bits of data for a time corresponding to the time interval at which the count values M1, M2, ... are sampled, as shown in FIG. 6(c). The adder 191 adds the lower four-bits of data of the previously sampled phase error data DP to the lower four-bits of data of the presently sampled phase error data DP in such a manner that 1 is added to the digit at the fourth bit position from the most significant bit (MSB) of the phase error data DP. The added data are fed through the subtracter 194 and the delay circuit 195 to the adder 191 again. This operation is repeated so that the adder 191 accumulates the lower four-bits of data.

When the lower four-bits of data are accumulated, 1 is added to the digit at the fourth bit position from the most significant bit (MSB) of the phase error data DP; that is, at the lowermost bit position of the upper four-bits of data obtained from the AND gate 192. The upper four-bits of data are fed to the second gain control circuit 198.

Figure 9:
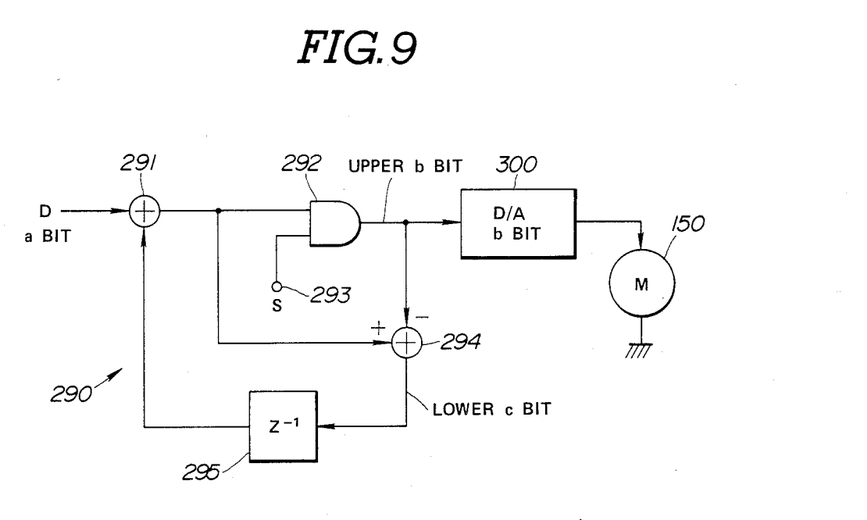
FIG. 9 is a schematic block diagram showing a modified form of the motor rotation control apparatus of the invention.

Referring to FIG. 9, there is illustrated a modified form of the data modification circuit applied for more general purposes. This modification is effective to compensate for the lower bits of data of a-bit error data inputted to the data modification circuit, the upper bits of data being fed to a digital-to-analog converter 300 having an effective bit number b smaller than the bit number a of the error data.

In FIG. 9, the data modification circuit, generally designated by the numeral 290, includes an adder 291 having an input at which a-bit data D are fed. The adder 291 has an output connected to one input of and AND gate 292 having another input connected to a terminal 293 to which a signal having a code is applied for extracting the upper bits of (b-bit) data from the inputted a-bit data D. The output of the adder 291 is also connected to one input of a subtracter 294 which has another input connected to the output of the AND gate 292. The output of the subtracter 294 is connected through a delay circuit 295 to another input of the adder 291. The output of the AND gate 292 is connected to the digital-to-analog converter 300 which converts a b-bit digital signal into a corresponding analog signal which is used to control a motor 150.

The AND gate 292 is open to communicate the data from the adder 291 to the digital-to-analog converter 300 when it receives a logic 1 level signal at the other input 293 to which the code signal S is applied. Therefore, the AND gate 292 communicates the upper b-bit data of the a-bit data D to the digital-to-analog circuit 300 and also to the subtracter 294 which subtracts the upper b-bit data from the a-bit data D fed thereto from the adder 291. As a result, the subtracter 294 develops a signal representing the lower c (a−b) bit data. The lower c-bit data are fed to the delay circuit 295, which provides a predetermined time delay relative to the signal applied thereto from the subtracter 294, the predetermined time delay corresponding to one sampling interval at which the data D is formed. The delay circuit 295 may employ a memory, a shift register, or the like capable of delaying the lower c-bit data a time corresponding to the one sampling time. The adder 291 adds the lower c-bit data of the previously sampled data D to the lower c-bit data of the presently sampled data D in a similar manner as described in connection with FIG. 7. The added data are fed through the subtracter 294 and the delay circuit 295 to the adder 291 again. This operation is repeated so that the adder 291 accumulates the lower c-bit data. When the lower c-bit data are accumulated, 1 is added to the digit at the lowermost bit position of the upper b-bit data. The upper b-bit data are fed to the digital-to-analog converter 300 where they are converted into digital form for controlling the motor 150. It is, therefore, apparent that the apparatus is effective to improve the motor rotation control accuracy.

Figure 10:
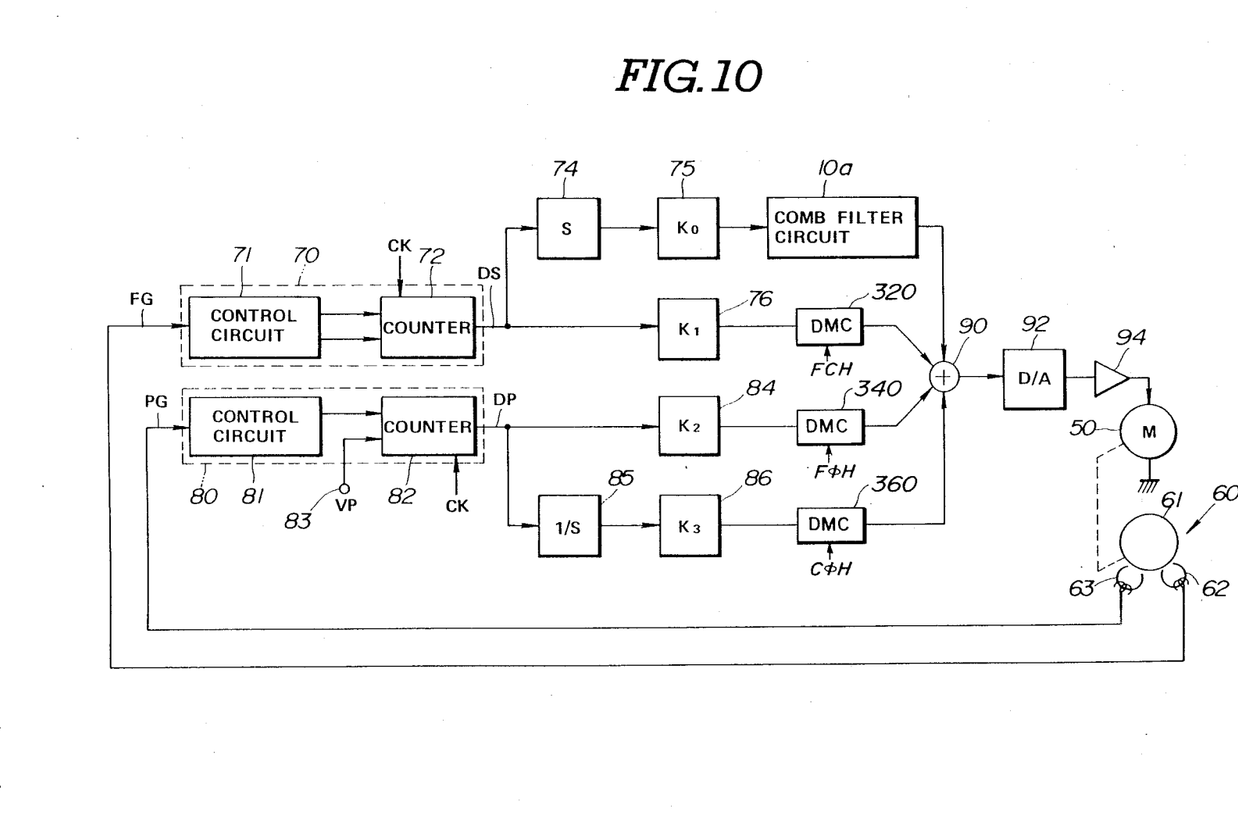
FIG. 10 is a schematic block diagram showing a third embodiment of the motor rotation control apparatus of the invention.

Referring to FIG. 10, there is illustrated a third embodiment of the servo control apparatus of the invention which is substantailly the same as the embodiment shown and described in connection with FIG. 5 except for a data modulation circuit provided in each of the circuits to the adder 90. Accordingly, parts in FIG. 10 which are like those in FIG. 5 have been given like reference numerals. Parts which are slightly different in form have been given like reference numerals with a prime suffix.

In this embodiment, a data modulation circuit 320 is provided on a line between the second multiplier circuit 76 and the adder 90. The data modulation circuit 320 is substantially the same as the data modulation circuit 290 shown and described in connection with FIG. 9 except for the code signal applied to the other input 203 of the AND gate 292. The code signal FCH, which is dependent on the multiplication factor K1, is selected in a manner permitting the digital-to-analog converter 92 to convert the input digital data into analog form without omitting any part of the digital data, as described in connection with FIGS. 7 and 9. For example, the code signal FCH may be "11111100" if the multiplication factor K1 is $2^{-2}$. A data modulation circuit 340 is provided on a line between the second multiplier circuit 84 and the adder 90. The data modulation circuit 340 is substantially the same as the data modulation circuit 290 shown andd described in connection with FIG. 9 except for the code signal applied to the other input 293 of the AND gate 292. The code signal F$\phi$H, which is dependent on the multiplication factor K2, is selected in a manner permitting the digital-to-analog converter 92 to convert the input digital data into analog form without omitting any part of the digital data, as described in connection with FIGS. 7 and 9. For example, the code signal F$\phi$H may be "11110000" if the multiplication factor K2 is $2^{-4}$. A data modulation circuit 360 is provided on a line between the second multiplier circuit 86 and the adder 90. The data modulation circuit 360 is substantially the same as the data modulation circuit 290 shown and described in connection with FIG. 9 except for the code signal applied to the other input 293 of the AND gate 292. The code signal C$\phi$H, which is dependent on the multiplication factor K3, is selected in a manner permitting the digital-to-analog converter 92 to convert the input digital data into analog form without omitting any part of the digital data, as described in connection with FIGS. 7 and 9. For example, the code signal F$\phi$H may be "11000000" if the multiplication factor K3 is $2^{-6}$.

Figure 11:
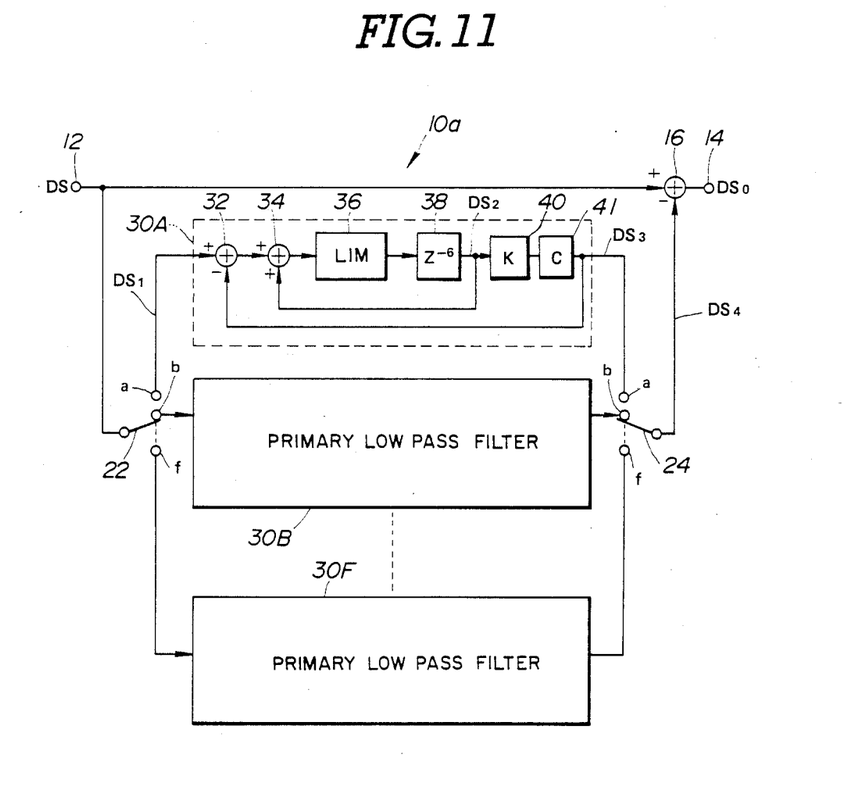
FIG. 11 is a schematic block diagram of a comb filter circuit applicable to the third embodiment of the motor rotation control apparatus.

Referring to FIG. 11, the comb filter circuit 10a is shown in detail. The comb filter circuit 10a is substantially the same as the comb filter circuit 10 described in FIG. 1 except for a data modification circuit 41 which is connected at the output of the multiplier 40. The data modification circuit 41 is substantially the same as the data modulation circuit 290 shown and described in connection with FIG. 9 except for the code signal applied to the other input 293 of the AND gate 292. The code signal, which is dependent on the multiplication factor K, is selected in a manner permitting the digital-to-analog converter 92 to convert the input digital data into analog form without omitting any part of the digital data, as described in connection with FIGS. 7 and 9.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. A apparatus for controlling the rotation of a motor, comprising:
    a sensor for sensing the speed and phase of the motor rotation and for generating a motor rotation signal indicative of the sensed speed and phase of the motor rotation;
    a signal processor connected to the sensor for processing the motor rotation signal to provide an error signal indicative of an error between the sensed speed and phase and a desired speed and phase;
    means connected to the signal processor for extracting an alternating current component from the error signal;
    a comb filter circuit supplied with the alternating current component, for providing a filtered signal by filtering out a motor rotation component which is superimposed on the motor rotation signal at a frequency of rotation of the motor and its higher harmonics;
    an adder for adding the filtered signal fed from the comb filter circuit and the error signal fed from the signal processor to provide a control signal; and
    driving means responsive to the control signal for driving the motor.

2. An apparatus for controlling the rotation of a motor, comprising:
    a sensor for sensing the speed and phase of the motor rotation and for generating a motor rotation signal indicative of the sensed speed and phase of the motor rotation;
    a signal processor connected to the sensor for processing the motor rotation signal to provide an error signal indicative of an error between the sensed speed and phase and a desired speed and phase;
    means connected to the signal processor for extracting an alternating current component from the error signal;
    a first circuit supplied with the alternating component for multiplying it by a predetermined first value,
    a comb filter circuit supplied with the output of the first circuit, for providing a filtered signal by filtering out a motor rotation component which is superimposed on the motor rotation signal at a frequency of rotation of the motor and its higher harmonics;
    a second circuit supplied with the error signal for multiplying it by a predetermined second value less than the first value;
    an adder for adding the filtered signal fed from the comb filter circuit and the error signal fed from the second circuit to provide a control signal; and
    driving means responsive to the control signal for driving the motor.

3. The apparatus as claimed in claim 1, wherein the comb filter circuit includes an input terminal connected to the alternating current component extracting means, an output terminal connected to the adder, a plurality of primary low pass filters, and switching means for connecting different ones of the primary low pass filters between the input and output terminals in a predetermined sequence at a predetermined number of degrees of the motor rotation.

4. An apparatus for controlling the rotation of a motor, comprising:
    a sensor sensitive to the motor's rotation speed and phase for generating speed and phase signals indicative of the sensed motor rotation speed and phase, respectively;
    a first signal processor for processing the speed signal to provide successive digital speed error signals each having a predetermined bit number representing a speed error between the sensed motor rotation speed and a target motor rotation speed;
    a second signal processor for processing the phase signal to provide successive digital phase error signals each having a predetermined bit number representing a phase error between the sensed motor rotation phase and a target motor rotation phase;

means connected to the first signal processor for extracting an alternating current component from the digital speed error signal;

a comb filter circuit for filtering out a motor rotation component which is superimposed on the speed signal at a frequency of rotation of the motor and its higher harmonics from the alternating current component to provide a filtered signal;

an adder for adding the digital speed error signal fed thereto from the first signal processor, the digital phase error signal fed thereto from the second signal processor, and the filtered signal fed thereto from the comb filter circuit;

a digital-to-analog converter for converting a digital signal fed from the adder into a corresponding analog signal to provide a control signal; and drive means responsive to the control signal for driving the motor.

5. An apparatus for controlling the rotation of a motor, comprising:

a sensor sensitive to the motor's rotation speed and phase for generating speed and phase signals indicative of the sensed motor rotation speed and phase, respectively;

a first signal processor connected to the sensor for processing the speed signal to provide successive digital speed error signals each having a predetermined bit number representing a speed error between the sensed motor rotation speed and a target motor rotation speed;

extracting means connected to the first signal processor for extracting an alternating current component from the digital speed error signals;

a first gain control means connected to the extracting means and supplied with the alternating current component for multiplying it by a first value;

a second gain control means connected to the first signal processor and supplied with the digital speed error signals for multipying them by a second value smaller than the first value;

a second signal processor for processing the phase signal to provide successive digital phase error signals each having a predetermined bit number representing a phase error between the sensed motor rotation phase and a target motor rotation phase;

a third gain control means connected to the second signal processor and supplied with the digital phase error signals for multiplying them by a third value smaller than the second value;

a comb filter circuit connected to the first gain control means for receiving the multiplied alternating current component and filtering out of it a motor rotation component which is superimposed on the speed signal at a frequency of rotation of the motor and its higher harmonics to provide a filtered signal;

an adder for adding the multiplied digital speed error signals fed thereto from the second gain control means, the multiplied digital phase error signals fed thereto from the third gain control means, and the filtered signal fed thereto from the comb filter circuit;

a digital-to-analog converter for converting a digital signal fed from the adder into a corresponding analog signal to provide a control signal; and drive means responsive to the control signal for driving the motor.

6. The apparatus as claimed in claims 4 or 5, wherein the comb filter circuit includes an input terminal connected to the alternating current component extracting means, an output terminal connected to the adder, a plurality of primary low pass filters, and switching means for connecting different ones of the primary low pass filters between the input and output terminals in a predetermined sequence at a predetermined number of degrees of the motor rotation.

7. The apparatus as claimed in claim 6, which includes:

a first data modification circuit interposed between the first signal processor and the adder for dividing each of the successive digital speed error signals into a first digital signal having upper bits of data, the first digital signal being output to the adder, and a second digital signal having the remaining lower bits of data, the first data modification circuit including means for adding the second digital signal to the next one of the successive digital speed error signals; and a second data modification circuit interposed between the second signal processor and the adder for dividing each of the successive digital phase error signals into a third digital signal having upper bits of data, the third digital signal being output to the adder, and a fourth digital signal having the remaining lower bits of data, the second data modification circuit including means for adding the fourth digital signal to the next one of the successive digital phase error signals.

8. An apparatus for controlling the rotation of a motor, comprising:

a sensor sensitive to the speed and phase of the motor rotation for generating a sensor signal corresponding to the sensed motor rotation speed and phase;

a signal processor connected to the sensor for processing the sensor signal to provide successive digital error signals each having a predetermined bit number representing an error between the sensed motor rotation speed and phase and a target motor rotation speed and phase;

a digital-to-analog converter having a predetermined effective bit number for converting a digital signal into a corresponding analog signal used to control the motor rotation; and a data modification circuit connected between the signal processor and the digital-to-analog converter for dividing each of the successive digital error signals into a first digital signal having upper bits of data having a bit number equal to or less than that of the digital-to-analog converter and a second digital signal having the remaining lower bits of data, the first digital signal being applied to the digital-to-analog converter, the data modification circuit including means for adding the second digital signal to the next one of the successive digital error signals.

9. The apparatus as claimed in claim 8, wherein the data modification circuit includes an AND gate having one input connected to the signal processor and another input connected to receive a code signal for opening the AND gate to communicate the first digital signal having the upper bits of data to the digital-to-analog converter, and means for subtracting the first digital signal from the digital error signal to produce the second digital signal having the lower bits of data.

10. The apparatus as claimed in claim 9, wherein the data modification circuit includes a delay circuit for delaying the second digital signal for a predetermined time, and an adder having an input connected to the signal processor and another input connected to the delay circuit for adding the second digital signal to the next digital error signal, the adder having an output connected to the one input of the AND gate.

11. An apparatus for controlling the rotation of a motor, comprising:
 a sensor sensitive to the motor's rotation speed and phase for generating speed and phase signals indicative of the sensed motor rotation and speed and phase, respectively;
 a first signal processor for processing the speed signal to provide successive digital speed error signals each having a predetermined bit number representing a speed error between the sensed and target motor rotation speeds;
 a second signal processor for processing the phase signal to provide successive digital phase error signals each having a predetermined bit number representing a phase error between the sensed and target motor rotation phase;
 a data modification circuit connected to the second signal processor for dividing each of the successive digital phase error signals into a first digital signal having upper bits of data and a second digital signal having the remaining lower bits of data, the data modification circuit including means for adding the second digital signal to the next one of the successive digital error signals;
 an adder circuit for adding the digital speed error signal fed thereto from the first signal processor and the first digital signal fed from the data modification circuit;
 a gain control circuit for multiplying the digital speed error signal to the adder circuit by a first value and multiplying the first digital signal to the adder circuit by a second value smaller than the first value; and
 a digital-to-analog converter for converting a digital signal fed from the adder circuit into a corresponding analog signal used to control the motor rotation.

12. The apparatus as claimed in claim 11, wherein the data modification circuit includes an AND gate having one input connected to the second signal processor and another input connected to a source of a code signal for opening the AND gate to communicate the first digital signal having the upper bits of data to the gain control circuit, and means for subtracting the first digital signal from the digital phase error signal to produce the second digital signal having the lower bits of data.

13. The apparatus as claimed in claim 12, wherein the data modification circuit includes a delay circuit for delaying the second digital signal a predetermined time, and an adder having an input connected to the second signal processor and another input connected to the delay circuit for adding the second digital signal to the next digital error signal, the adder having an output connected to the one input of the AND gate.

14. The apparatus as claimed in claim 11, which includes means connected to the first signal processor for extracting an alternating current component from the digital speed error signal, and a comb filter circuit interposed between the alternating current component extracting means and the adder for filtering out a motor rotation component which is superimposed on the speed signal at a frequency of rotation of the motor and its higher harmonics from the AC component to provide a filtered signal, and wherein the adder adds the digital speed error signal fed thereto from the first signal processor, the first digital signal fed from the data modification circuit, and the filtered signal fed thereto from the comb filter circuit to provide the control signal.

15. The apparatus as claimed in claim 14, wherein the comb filter circuit includes an input terminal connected to the alternating current component extracting means, an output terminal connected to the adder, a plurality of primary low pass filters, and switching means for connecting different ones of the primary low pass filters between the input and output terminals in a predetermined sequence at a predetermined number of degrees of the motor rotation.

16. The apparatus as claimed in claim 2, wherein the comb filter circuit includes an input terminal connected to the first circuit, an output terminal connected to the adder, a plurality of primary low pass filters, and switching means for connecting different ones of the primary low pass filters between the input and output terminals in a predetermined sequence at a predetermined number of degrees of the motor rotation.

17. An apparatus for controlling the rotation of a motor, comprising:
 a sensor for sensing the speed and phase of the motor rotation and for generating a motor rotation signal indicative of the sensed speed and phase of the motor rotation;
 a signal processor connected to the sensor for processing the motor rotation signal to provide an error signal indicative of an error between the sensed speed and phase and a desired speed and phase;
 means connected to the signal processor for extracting an alternating current component from the error signal;
 a comb filter circuit supplied with the alternating component for providing a filtered signal by filtering out a motor rotation component which is superimposed on the motor rotation signal at a frequency of rotation of the motor and its higher harmonics, the comb filter circuit including first multiplying circuit means for multiplying the signal passing through the comb filter means by a predetermined first value;
 a second multiplying circuit means supplied with the error signal for multiplying it by a predetermined second value less than the first value;
 an adder for adding the filtered signal fed from the comb filter circuit and the error signal fed from the second circuit to provide a control signal; and
 driving means responsive to the control signal for driving the motor.

18. An apparatus for controlling the rotation of a motor, comprising:
 a sensor sensitive to the motor's rotation speed and phase for generating speed and phase signals indicative of the sensed motor rotation speed and phase, respectively;

a first signal processor connected to the sensor for processing the speed signal to provide successive digital speed error signals each having a predetermined bit number representing a speed error between the sensed motor rotation speed and a target motor rotation speed;

extracting means connected to the first signal processor for extracting an alternating current component from the digital speed error signals;

a comb filter circuit connected to the extracting means for receiving the alternating current component and filtering out of it a motor rotation component which is superimposed on the speed signal at a frequency of rotation of the motor and its higher harmonics to provide a filtered signal, the comb filter circuit including a first gain control means for multiplying the signal passing through the comb filter circuit by a first value;

a second gain control means connected to the first signal processor and supplied with the digital speed error signals for multiplying them by a second value smaller than the first value;

a second signal processor for processing the phase signal to provide successive digital phase error signals each having a predetermined bit number representing a phase error between the sensed motor rotation phase and a target motor rotation phase;

a third gain control means connected to the second signal processor and supplied with the digital phase error signals for multiplying them by a third value smaller than the second value;

an adder for adding the multiplied digital speed error signals fed thereto from the second gain control means, the multiplied digital phase error signals fed thereto from the third gain control means, and the filtered signal fed thereto from the comb filter circuit;

a digital-to-analog converter for converting a digital signal fed from the adder into a corresponding analog signal to provide a control signal; and drive means responsive to the control signal for driving the motor.

* * * * *